US008791677B2

(12) United States Patent
Yang et al.

(10) Patent No.: US 8,791,677 B2
(45) Date of Patent: Jul. 29, 2014

(54) POWER FACTOR CORRECTION CIRCUIT FOR CORRECTING POWER FACTOR

(75) Inventors: Jeong Mo Yang, Seoul (KR); Chang Sik Yoo, Seoul (KR); Yung Jin Moon, Gwangju (KR); Yong Seong Roh, Incheon (KR); Joong Ho Choi, Gyunggi-do (KR); Jae Shin Lee, Gyunggi-do (KR); Jung Chul Gong, Seoul (KR); Yu Jin Jang, Gyunngi-do (KR)

(73) Assignees: Samsung Electro-Mechanics Co., Ltd., Gyunggi-Do (KR); University of Seoul Industry Cooperation Foundation, Seoul (KR)

( * ) Notice: Subject to any disclaimer, the term of this patent is extended or adjusted under 35 U.S.C. 154(b) by 257 days.

(21) Appl. No.: 13/162,793

(22) Filed: Jun. 17, 2011

(65) Prior Publication Data

US 2012/0087160 A1    Apr. 12, 2012

(30) Foreign Application Priority Data

Oct. 12, 2010   (KR) .................. 10-2010-0099404

(51) Int. Cl.
  *H02M 3/156*    (2006.01)
(52) U.S. Cl.
  USPC .......................................... 323/283; 323/207
(58) Field of Classification Search
  USPC ......... 323/205, 207, 222, 282, 283, 284, 288, 323/315; 363/89
  See application file for complete search history.

(56) References Cited

U.S. PATENT DOCUMENTS

| 5,742,151 | A  | * | 4/1998  | Hwang ........................ 323/222 |
| 5,764,039 | A  | * | 6/1998  | Choi et al. ................... 323/285 |
| 7,064,527 | B2 | * | 6/2006  | Adragna ...................... 323/285 |
| 2004/0095101 | A1 | * | 5/2004  | Pidutti et al. ................. 323/222 |
| 2007/0279032 | A1 | * | 12/2007 | Chang et al. ................. 323/315 |
| 2007/0296389 | A1 | * | 12/2007 | Chen et al. ................... 323/290 |
| 2008/0273356 | A1 | * | 11/2008 | Melanson ...................... 363/47 |
| 2009/0103338 | A1 | * | 4/2009  | Nakamura ..................... 363/89 |
| 2009/0273330 | A1 | * | 11/2009 | Sisson .......................... 323/288 |
| 2011/0095732 | A1 | * | 4/2011  | Park et al. .................... 323/207 |
| 2011/0110127 | A1 | * | 5/2011  | Lee .............................. 363/44 |

FOREIGN PATENT DOCUMENTS

KR    10-2006-0026701 A    3/2006

* cited by examiner

*Primary Examiner* — Gary L Laxton
*Assistant Examiner* — Alex Torres-Rivera
(74) *Attorney, Agent, or Firm* — Lowe Hauptman & Ham, LLP

(57) ABSTRACT

There is provided a power factor correction circuit capable of correcting a power factor of a power converting module through increasing an input current by switching a main switching element of a power converting module on the basis of a first reference wave having a slope based on a first signal and an error voltage, in particular, by limiting a switching frequency on the basis of a first reference wave having a slope based on a second signal lower than a first signal and an error voltage when the switching frequency of the main switching element increases because an input voltage of the power converting module is low.

11 Claims, 4 Drawing Sheets

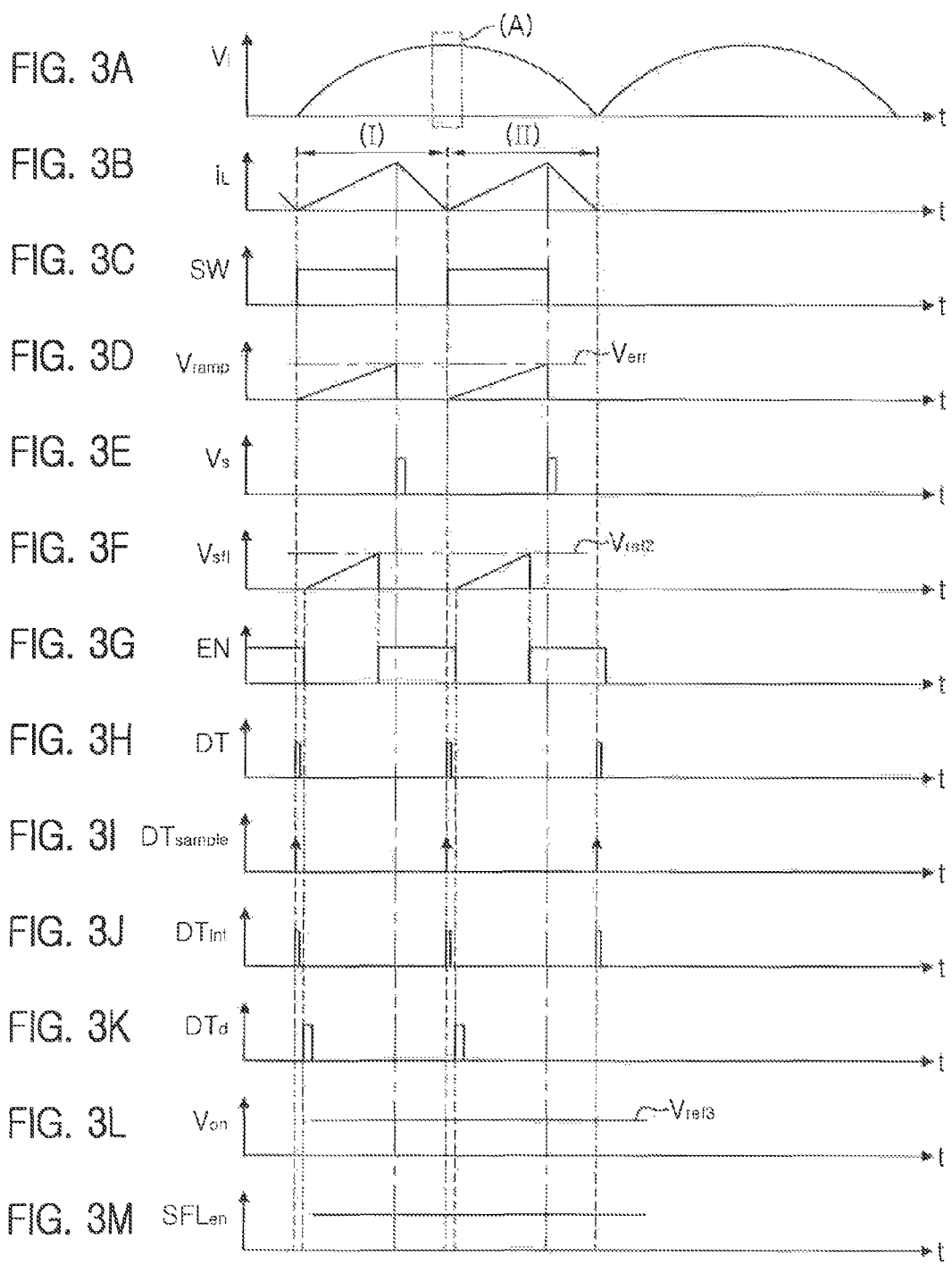

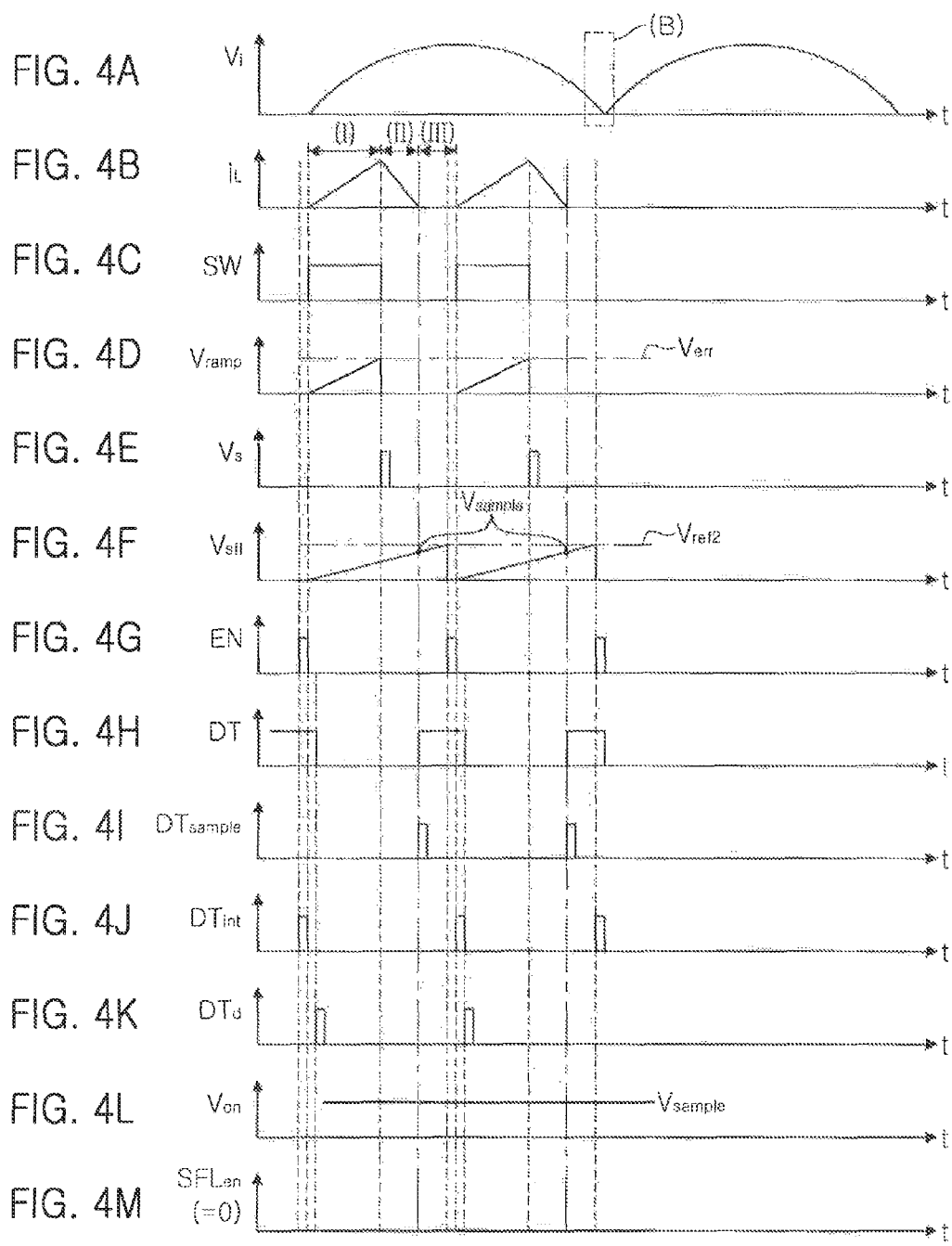

POWER FACTOR CORRECTION CIRCUIT FOR CORRECTING POWER FACTOR

CROSS-REFERENCE TO RELATED APPLICATIONS

This application claims the priority of Korean Patent Application No. 10-2010-0099404 filed on Oct. 12, 2010, in the Korean Intellectual Property Office, the disclosure of which is incorporated herein by reference.

BACKGROUND OF THE INVENTION

1. Field of the Invention

The present invention relates to a power factor correction circuit, and more particularly, to a power factor correction circuit capable of correcting a power factor of a power converting module through increasing the average value of an input current by switching a main switching element of the power converting module on the basis of a reference wave having a slope based on a first signal and an error voltage, in particular, by limiting a switching frequency on the basis of a reference wave having a slope based on a second signal lower than a first signal and an error voltage when the switching frequency of the main switching element increases because an input voltage of the power converting module is low.

2. Description of the Related Art

In recent years, the stable supply of power has become an issue due to an increase in power consumption generated by using an electronic apparatuses. Therefore, countries around the world have been strengthening restrictions relating to a harmonic component generated by an input terminal of the electronic apparatus in order to minimize an influence on a power supply line of the electronic apparatus and minimize interference with other electronic apparatuses. In order to satisfy the restrictions on the generation of the harmonic component, a power factor correction circuit is required.

In the power factor correction circuit used in the power converting module such as a boost-type converter according to the related art, a boundary conduction mode (BCM) is generally used due to the ease of the implementation of zero voltage switching (ZVS). However, in the case of the boundary conduction mode, a switching loss increases because the switching frequency increases when a current required for an input is small or an input voltage is low, and as a result, efficiency decreases.

SUMMARY OF THE INVENTION

An aspect of the present invention provides a power factor correction circuit, capable of correcting a power factor of a power converting module through increasing the average value of an input current by limiting a switching frequency when the switching frequency of a main switching element increases because an input voltage of the power converting module is low.

According to an aspect of the present invention, there is provided a power factor correction circuit including: a power converting module converting an input voltage into an output voltage having a predetermined magnitude by controlling an inductor current according to a main switching signal applied to a main switch; a signal selecting module selectively outputting a first signal having a fixed value or a second signal having a variable value smaller than the first signal, for determining a slope of a first reference wave on a basis of the inductor current, and generating a set signal for rising a first reference wave; a first reference wave generating module generating the first reference wave that rises at a slope based on any one of the first signal and the second signal according to the set signal and is reset according to a first reset signal based on an error voltage between the output voltage and a predetermined first reference voltage; and a main switching signal generating module generating the main switching signal which is set to be Low (L) by the first reset signal and to be High (H) by the set signal.

The signal selecting module may include: a first module generating a second reference wave that increases depending on a delay signal acquired by delaying the set signal for a predetermined time and is reset depending on a second reset signal formed based on a second reference voltage; a second module generating a selection signal for selecting any one of the first signal and the second signal on a basis of the second reset signal and a zero current sensing signal DT generated during a period in which the inductor current is 0, a pulse signal for detecting a rising edge of the zero current sensing signal DT, and the set signal; and a third module sampling the magnitude of the second reference wave at the time when the rising edge is detected and setting the corresponding magnitude as the second signal and selectively outputting any one of the first signal and the second signal on a basis of the selection signal.

The first reference wave generating module may include: a current mirroring unit mirroring a current formed based on the first signal or the second signal; a current mirroring unit mirroring a current formed based on the first signal or the second signal; a first capacitor charging a voltage by the mirrored current; and a first switch connected to the first capacitor in parallel and controlling charging and discharging of the first capacitor according to the set signal or the first reset signal.

The main switching signal generating module may include: an error amplifier generating the error voltage between the output voltage and the first reference voltage; a first comparator generating the first reset signal according to a comparison result between the error voltage and the first reference wave; a first RS latch having an S terminal receiving an output of the first comparator, an R terminal receiving the set signal, and a Q terminal connected to an on/off control terminal of the first switch; and an inverter positioned between the Q terminal of the first RS latch and the main switch and inverting a signal outputted from the Q terminal of the first RS latch.

The first module may include: a current source; a second capacitor connected to the current source in series; a second comparator having a positive (+) terminal connected to a connection portion between the current source and the second capacitor and a negative (−) terminal to which the second reference voltage is applied; a second transistor having a drain connected to the (+) terminal of the second comparator, a source which is grounded, and a gate connected to a Q terminal of a second RS latch; and the second RS latch having the Q terminal connected to the gate of the second transistor, an S terminal connected to an output terminal of the second comparator, and an R terminal connected to the outside.

The second module may include: a third latch receiving a voltage of 0V through a first input terminal thereof and receiving the zero current sensing signal through a second input terminal thereof, and outputting the signal inputted into the first input terminal or the second input terminal depending on an output from the Q terminal by being connected to the Q terminal of the second RS latch; a delay unit having an input terminal connected to the output terminal of the third latch and an output terminal connected to the R terminal of the second RS latch to generate a delay signal delayed from the set signal inputted into the first input terminal or the second input terminal by a predetermined time; a rising edge detecting unit connected to the second input terminal of the third latch to output the pulse signal when the zero current sensing signal rises; and a D-flip-flop having a D terminal connected to the Q terminal of the second RS latch, and outputting the signal outputted from the Q terminal of the second RS latch as the selection signal according to the pulse signal from the rising edge detecting unit.

The third module may include: a sampling unit having one end connected to a connection, portion of the second capacitor and the current source and generating the second signal acquired by sampling the magnitude of the voltage charged in the second capacitor according to the pulse signal from the rising edge detecting unit; and a fourth latch connected to an output terminal of the sampling unit to receive the second signal inputted from the output terminal through a first input terminal and receive the first signal through a second input terminal and selectively outputting the first signal or the second signal according to the selection signal outputted from the D-flip-flop.

A voltage follower may be installed between the connection portion between the second capacitor and the current source, and the sampling unit.

The power converting module may be a boost-type converter.

The inductor current may be controlled in any one of a boundary conduction mode (BCM) and a discontinuous conduction mode (DCM) depending on the main switching signal.

The first reference wave and the second reference wave may be triangular waves.

The inductor current may operate in the discontinuous conduction mode (DCM) when the zero current sensing signal is generated before the second reference wave which rises according to the set signal reaches the second reference voltage and operates in the boundary conduction mode (BCM) when the zero current sensing signal is generated after the second reference wave which rises according to the set signal reaches the second reference voltage.

The rising edge detecting unit may include: an inverting portion receiving the zero current sensing signal and constituted by even number of inverters which are connected to each other in series; and an AND gate receiving an output of the inverter portion and the zero current sensing signal.

BRIEF DESCRIPTION OF THE DRAWINGS

The above and other aspects, features and other advantages of the present invention will be more clearly understood from the following detailed description taken in conjunction with the accompanying drawings, in which:

FIGS. 3A through 3M show waveform diagrams showing waveforms of individual components in the case of operation in a boundary conduction mode according to an exemplary embodiment of the present invention; and FIGS. 4A through 4M show waveform diagrams showing waveforms of individual components in the case of operation in a discontinuous conduction mode according to an exemplary embodiment of the present invention.

DETAILED DESCRIPTION OF THE PREFERRED EMBODIMENT

Figure 1:
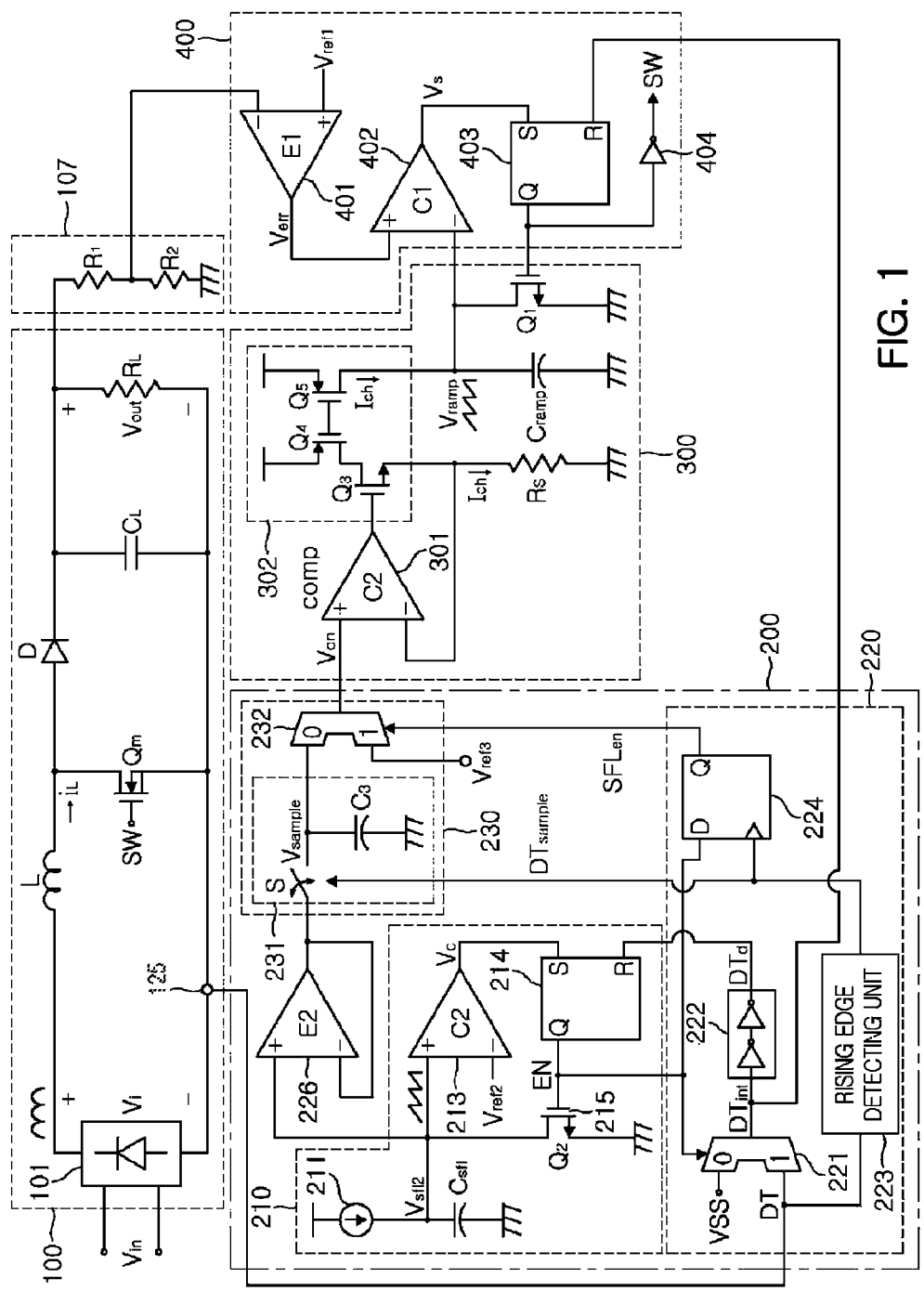
FIG. 1 is a configuration diagram of a power factor correction circuit according to an exemplary embodiment of the present invention.

Exemplary embodiments of the present invention will now be described in detail with reference to the accompanying drawings.

The present invention is not limited to the exemplary embodiments and the exemplary embodiments are used to help in understanding the spirit of the present invention. Like reference numerals refer to like elements in the accompanying drawings.

FIG. 1 is a configuration diagram of a power factor correction circuit according to an exemplary embodiment of the present invention and may include a power converting module 100, a signal selecting module 200, a first reference wave generating module 300, and a main switching signal generating module 400. Meanwhile, FIGS. 2A through 2D show diagrams showing configurations of a rising edge detecting unit 223 according to an exemplary embodiment of the present invention.

Referring to FIG. 1, the power converting module 100 converts an input voltage Vin into an output voltage Vout having a predetermined magnitude by controlling an inductor current $i_L$ according to a main switching signal SW applied to a main switch Qm.

In detail, the power converting module 100 may include a rectifier 101 connected in parallel to an input terminal thereof and performing full-wave rectification on AC input voltage Vin, an inductor L having one end connected to the rectifier 101 and the other end connected to the main switch Qm, the main switch Qm having a drain connected to the other end of the inductor L and a source connected to the rectifier 101, which controls a current that flows on the inductor L by receiving the main switching signal SW through a gate terminal, a diode D having an anode connected to the drain of the main switch Qm and a cathode connected to a rectifying capacitor $C_L$, the rectifying capacitor $C_L$ connected to the cathode of the diode D, and a load RL connected to both ends of the rectifying capacitor $C_L$. According to an exemplary embodiment of the present invention, the power converting module 100 is illustrated as a boost type converter by way of example, but it is not necessarily limited thereto and the power converting module 100 may be applied to even diversified power converting modules such as a buck converter, a buck boost converter, and the like.

The signal selecting module 200 may selectively output a first signal Vref3 having a fixed value or a second signal Vsample having a variable value smaller than that of the first signal Vref3, for determining a slope of a first reference wave Vramp on the basis of the current $i_L$ that flows on the inductor L, and generate a set signal DTint. The signal selecting module 200 may include a first module 210, a second module 220, and a third module 230 and hereinafter, a detailed, configuration of each module will be described in detail.

The first module 210 of the signal selecting module 200 generates a second reference wave Vsf1 that, increases depending on a delayed signal DTint of the set signal DTint and is reset depending on a second reset signal Vc formed based on a second reference voltage Vref2.

In detail, the first module 210 may include a current source 211, a second capacitor Csf1 connected to the current source 211 in series, a second comparator 213 having a (+) terminal connected to a connection portion between the current source 211 and the second capacitor Csf1 and a (−) terminal to which the second reference voltage Vref2 is applied, a second transistor Q2 having a drain connected to the (+) terminal of the second comparator 213, a source which is grounded, and a gate connected to a Q terminal of a second RS latch 214, and the second RS latch 214 having the Q terminal connected to the gate of the second transistor Q2, an S terminal connected to an output terminal of the second comparator 213, and an R terminal connected to the outside.

The second module 220 of the signal selecting module 200 generates a selection signal SFLen for selecting any one of the first signal Vref3 and the second signal Vsample on the basis of a zero current sensing signal DT generated during a period in which a signal EN and the inductor current $i_L$ inputted from the Q terminal of the second RS latch 214 have a level of 0. Further, the second module 220 generates a pulse signal DTsample detecting a rising edge of the zero current sensing signal DT, and the set signal DTint.

In detail, a third latch 221 of the second module 220 receives a power Vss (0V voltage) through a first input terminal thereof and receives the zero current sensing signal DT through a second input terminal thereof, and outputs the signal inputted into the first input terminal or the second input terminal depending on the output En from the Q terminal by being connected to the Q terminal of the second RS latch 214.

A delay unit 222 of the second module 220 has an input terminal connected to the output terminal of the third latch 221 and an output terminal connected to the R terminal of the second RS latch 214 to generate a signal DTd delayed from the set signal DTint inputted into the first input terminal or the second input terminal by a predetermined time. The delay unit 222 may be constituted by even number of inverters.

The rising edge detecting unit 223 of the second module 220 is connected to the second input terminal of the third latch 221 to output the pulse signal DTsample when the zero current sensing signal DT rises. A detailed configuration of the rising edge defecting unit 223 is shown in FIG. 2.

Figure 2A:
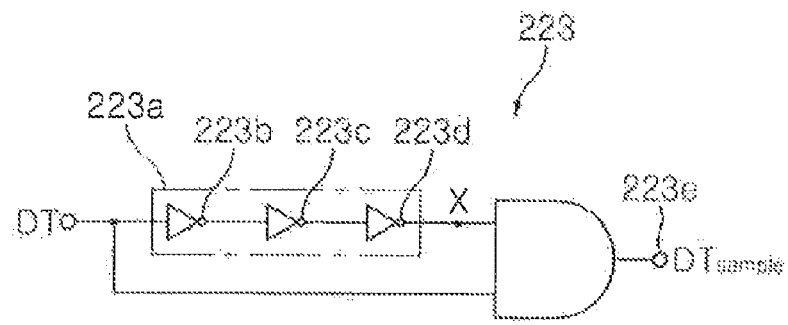
FIGS. 2A through 2D show diagrams showing configurations of a rising edge detecting unit according to an exemplary embodiment of the present invention.
Figure 2B:
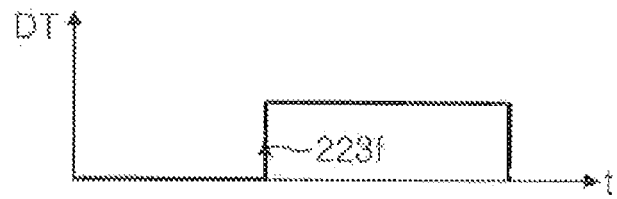

Referring to FIG. 2A, the rising edge detecting unit 223 may include an inverter portion 223a including a plurality of inverters 223b, 223c, and 223d that are connected in series to delay the input signal DT by a predetermined time and an AND gate 223e receiving an output of the inverter portion 223a and the input signal DT. T the number of the inverters 223b, 223c, and 223d is an odd number. The pulse signal DTsample outputted from the rising edge detecting unit 223 his the signal for detecting a rising edge 223f of the input signal DT.

Figure 2C:
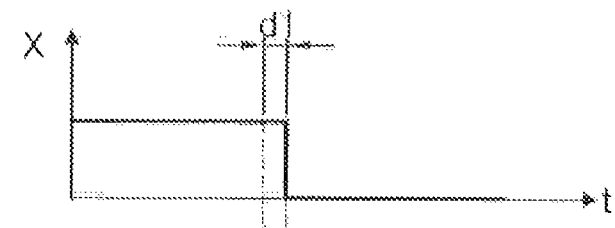
Figure 2D:
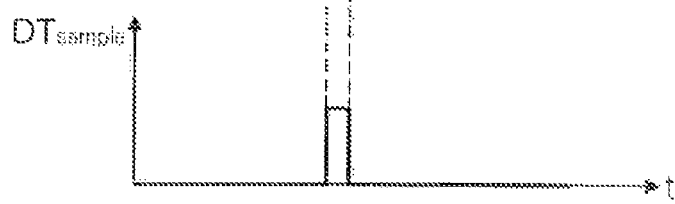

That is, as shown in FIG. 23, when the input signal DT is inputted, en inversion signal having a predetermined delay d1 as shown in FIG. 2C is inputted into an input terminal X of the AND gate 223e. The input signal DT is inputted into the other input terminal of the AND gate 223e as it is. An AND-operation is performed on the input signal DT and the output of the inverter portion 223a, in the AND gate 223e, and as a result, they rise at a rising time of the input signal DT to become a pulse signal having a predetermined width d1 as shown in FIG. 2D.

A D-flip-flop 224 of the second module 220 has a D terminal connected to the Q terminal of the second RS latch 214 and outputs the signal EN outputted from the Q terminal of the second RS latch 214 as the selection signal SFLen according to the pulse signal DTsample from the rising edge detecting unit 223.

The third module 230 of the signal selecting module 200 may sample the magnitude of the second reference wave Vsf1 no the time when the rising edge of the inductor current $i_L$ is detected and set the magnitude of the second reference wave Vsf1 as the second signal Vsample and selectively output any one of the first signal Vref3 and the second signal Vsample on the basis of the selection signal SFLen.

The first reference wave generating module 300 generates the first reference wave Vramp that rises at a slope based on any one of the first signal Vref3 and the second signal Vsample according to the set signal DTint and is reset according to the first reset signal Vs based on the output voltage Vout and the first reference voltage Vref1. The first reference wave generating module 300 may include a current, mirroring unit 302 mirroring a current formed based on the first signal Vref3 or the second signal Vsample, a first capacitor Cramp charging a voltage by the mirrored current, and a first switch Q1 connected to the first capacitor Cramp in parallel and controlling charging and discharging of the first capacitor Cramp according to the set signal DTint or the first reset signal Vs.

In detail, when an operation principle is described, the first signal Vref3 or the second signal Vsample is selectively outputted from a fourth latch 232 according to the selection signal SFLen. The first signal Vref3 has a fixed voltage having a predetermined value and the second signal Vsample is acquired by sampling the voltage charged in the second capacitor Csf1 at the time when the rising edge of the zero current sensing signal DT is detected (223f of FIG. 2). Voltages applied to a (+) terminal and a (−) terminal of the first reference wave generating module 300 are the same as each other by a characteristic of an amplifier 301, and as a result, a current Ich flows through a resistor Rs while a transistor Q3 is turned on. This current is mirrored by transistors Q4 and Q5 to flow through the opposite transistor Q5. Therefore, the first capacitor may be charged with this current. Meanwhile, as described below, the second signal Vsample is smaller than the first signal Vref3. Accordingly, a current by the second signal Vsample is smaller than the current Ich by the first signal Vref3, and as a result, a slope of a waveform of a voltage charged in a second capacitor C1 is the smaller.

The main switching signal generating module 400 generates a main switching signal SW which is set to Low (L) by the first reset signal Vs and High (H) by the set signal DTint. The main switch Qm of the power converting module 100 is controlled by the generated main switching signal SW.

In detail, the main switching signal generating module 400 may include an error amplifier 401 generating an error voltage Verr between, the output voltage Vout and the first reference voltage Vref1, a first comparator 402 generating the first reset signal Vs according to a comparison result between the error voltage Verr and the first reference wave Vramp, a first RS latch 403 having an S terminal receiving an output of the first comparator 402, an R terminal receiving the set signal DTint, and a Q terminal connected to a gate of the first switch Q1, and an inverter 404 positioned between the Q terminal of the first RS latch 403 and the main switch Qm and inverting a signal outputted from the Q terminal of the first RS latch 403. Meanwhile, a voltage distributing unit 107 including resistors R1 and R2 may be further included in a predetermined output voltage Vout through the resistors R1 and R2 which are connected to each other in series.

The operational principle of the power factor correction circuit having the above configuration will be described depending on a boundary conduction mode (BCM) or a discontinuous conduction mode (DCM).

FIGS. 3A through 3M show waveform diagrams showing waveforms of individual a components in the case of operation in a boundary conduction mode (BCM) according to an exemplary embodiment of the present invention. FIG. 3A shows the full wave-rectified input power Vi of the power converting module 100, FIG. 3B shows the current $i_L$ that flows on the inductor L of the power converting module 100, FIG. 3C shows the main switching signal SW, FIG. 3D shows the error voltage Verr and the first reference wave Vramp, FIG. 3E shows the first resent signal Vs outputted from the first comparator 402, FIG. 3F shows the second reference wave Vsf1 and the second reference voltage Vref2 inputted into the second comparator 213, FIG. 3G shows the output signal EN of the Q terminal of the second RS latch 214, FIG. 3H shows the zero current sensing signal DT outputted from a zero current sensing unit 125, FIG. 3I shows the pulse signal DTsample outputted from the rising edge detecting unit 223, FIG. 3J shows the set signal DTint outputted from the third latch 221, FIG. 3K shows the signal outputted from the delay unit 222, FIG. 3L shows the signal Von outputted from the fourth latch 232, and FIG. 3M shows the selection signal SFLen outputted from the D-flip-flop 224.

As shown in FIG. 3B, the current $i_L$ that flows on the inductor L operates in the boundary conduction mode (BCM) without a period when a state of 0 is continued. In the boundary conduction mode (BCM), the input voltage Vi is large as shown in FIG. 3A and in this period A, the switching frequency of the main switch Qm is not limited.

Hereinafter, referring to FIGS. 1 to 3, the operational principle according to the exemplary embodiment of the present invention will be described on the basis of waveforms of individual components during one cycle.

In a period I, the main switch Qm is turned on, such that the inductor current $i_L$ rises. The main switching signal SW is in a high state (see FIG. 3C) and a low signal is outputted from the output terminal Q of the first RS latch 403. As a result, the first transistor Q1 is turned off and the first capacitor Cramp is charged with the charged current Ich. The voltage waveform charged in the first capacitor Cramp, i.e., the first reference wave Vramp rises at a predetermined slope (see FIG. 3D).

Meanwhile, the second reference wave Vsf1 which is charged in the second capacitor Csf1 reaches the second reference voltage Vref2 before the period I ends (see FIG. 3F) and a high signal is inputted into the second RS latch 214 from the second comparator 213 at the time when the second reference wave Vsf1 exceeds the second reference voltage Vref2. As a result, the high signal is outputted from the Q terminal of the second RS latch 214 (see FIG. 3G). The high signal outputted from the Q terminal of the second RS latch 214 is inputted into the third latch 221 and while the signal inputted into the third latch 221 is in a high state, an input of a second terminal, i.e., the sere current sensing signal DT is outputted. Meanwhile, the second transistor 215 is turned on by the output signal EN of the second RS latch 214, and as a result, the second reference wave Vsf1 is discharged (see FIG. 3F).

In a period II, when the first reference wave Vramp which rises at a predetermined slope exceeds the error voltage Verr (see FIG. 3D), the first reset signal Vs is outputted from the first, comparator 402 (see FIG. 3E). The first reset signal Vs is a high signal. The outputted first reset signal Vs is inputted into the S terminal of the first RS latch 403 and the high signal is outputted through the Q terminal. The first transistor Q1 is turned on by the outputted high signal and the voltage charged in the first capacitor Cramp is discharged through the first transistor Q1 (see FIG. 3D). In addition, the high signal outputted from the Q terminal is inverted by the inverter 404 to become a low signal, which is inputted into the gate terminal of the main switch Qm. As a result, the main switch Qm is turned off and the inductor current $i_L$ gradually decreases (see FIG. 3B).

Meanwhile, when the current $i_L$ that flows on the inductor L is 0, the zero current sensing signal DT outputted from the zero current sensing unit 125 becomes high (see FIG. 3H). At this time, the rising edge detecting unit 223 generates a pulse signal DTsample by detecting the rising edge of the zero current sensing signal DT (see FIG. 3I). The generated pulse signal DTsample is applied to a sampling unit 231. The sampling unit 231 samples the voltage charged in the second capacitor Csf1 by the applied pulse signal DTsample. At this time, the voltage Vsample is 0V (see FIG. 3F). Further, the pulse signal DTsample is applied to the D-flip-flop 224 and the output signal EN of the second RS latch 214 is outputted to the fourth latch 232 as the selection signal SFLen (see FIG. 3M). The selection signal SFLen is high. Accordingly, the fourth latch 232 outputs a signal of a second terminal, i.e., the first signal Vref3 as the output signal Von (see FIG. 3I).

Meanwhile, the first capacitor Csf1 starts to be charged again when the high signal is inputted into the R terminal of the second RS latch 214. That is, when the zero current sensing signal DT is inputted while the Q terminal of the second RS latch 214 is high (see FIGS. 3G and 3H), the set signal DTint becomes the zero current sensing signal DT. The set signal DTint is delayed by the delay unit 222 by a predetermined time (see FIG. 3K) and thereafter, inputted into the second RS latch 214. As a result, a low signal is outputted from the Q terminal of the third latch 221 and the second transistor Q2 is turned off by the low signal outputted from the Q terminal of the third latch 221. As the second transistor Q2 is turned off, a second capacitor Vosc is charged at a predetermined slope again by the second current source 211.

Meanwhile, FIGS. 4A through 4M show waveform diagrams showing waveforms of individual components in the case of operation in a discontinuous conduction mode (DCM) according to an exemplary embodiment of the present invention. FIG. 4A shows the fullwave-rectified input power Vi of the power converting module 100, FIG. 4B shows the current $i_L$ that flows on the inductor L of the power converting module 100, FIG. 4C shows the main switching signal SW, FIG. 4D shows the error voltage Verr and the first reference wave Vramp, FIG. 4E shows the first resent signal Vs outputted from the first comparator 402, FIG. 4F shows the second reference wave Vsf1 and the second reference voltage Vref2 inputted into the second comparator 213, FIG. 4G shows the output signal EN of the Q terminal of the second RS latch 214, FIG. 4H shows the zero current detecting signal DT outputted from the zero current sensing unit 125, FIG. 4I shows the pulse signal DTsample outputted from the rising edge detecting unit 223, FIG. 4J shows the set signal DTint outputted from the third latch 221, FIG. 4K shows the signal outputted from the delay unit 222, FIG. 4L shows the signal Von outputted from the fourth latch 232, and FIG. 4M shows the selection signal SFLen outputted from the D-flip-flop 224.

As shown in FIG. 4B, the current $i_L$ that flows on the inductor L operates in the discontinuous conduction mode (DCM) in which a period III when a state of 0 is continued for a predetermined time is present. The discontinuous conduction mode (DCM) operates in a period B in which the input voltage Vi is small as shown in FIG. 4A and as the slope of the first reference wave Vramp decreases, the switching frequency of the main switch Qm is limited.

Hereinafter, referring to FIGS. 1, 2, and 4, the operational principle according to the exemplary embodiment of the present invention will be described on the basis of waveforms of individual components during one cycle.

In the period I, the main switch Qm is turned on, such that the inductor current $i_L$ rises. The main switching signal SW is in a nigh state (see FIG. 4C) and a low signal is outputted from the output terminal Q of the first RS latch 403. As a result, the first transistor Q1 is in an off state, the first capacitor Cramp is charged with the charged current Ich, and the voltage waveform charged in the first capacitor Cramp, i.e., the first reference wave Vramp raises at a predetermined slope (see FIG. 4D).

Meanwhile, even after the period I ends, the voltage is being charged in the first capacitor Csf1 and the voltage waveform of the first capacitor Csf1, i.e., the second reference wave Vsf1 continuously rises (see FIG. 4F). This is different from the operation of the boundary conduction mode (BCM) because the slope of the first reference wave Vramp is small. The switching frequency of the main switch Qm may be limited by making the slope of the first reference wave be small.

In the period II, when the first reference wave Vramp which rises at a predetermined slope exceeds the error voltage Verr (see FIG. 4D), the first reset signal Vs is outputted from the first comparator 402 (see FIG. 4E). The first reset signal Vs is a high signal. The outputted first reset signal Vs is inputted into the S terminal of the first RS latch 403 and the high signal is outputted through the Q terminal. The first transistor Q1 is turned on by the outputted high signal and the voltage charged in the first capacitor Cramp is discharged through the first transistor Q1 (see FIG. 4D). In addition, the high signal outputted from the Q terminal is inverted by the inverter 404 to become a low signal, which is inputted into the gate terminal of the main switch Qm. As a result, the main switch Qm is turned off and the inductor current $i_L$ gradually decreases (see FIG. 4B).

Meanwhile, when the current $i_L$ that flows on the inductor L is 0, the zero current sensing signal DT outputted from the zero current sensing unit 125 becomes high (see FIG. 4H). At this time, the rising edge detecting unit 223 generates the pulse signal DTsample by detecting the rising edge (223f of FIG. 2) of the zero current sensing signal DT (see FIG. 4I). The generated pulse signal DTsample is applied to a sampling unit 231. The sampling unit 231 samples the voltage charged in the second capacitor Csf1 by the applied pulse signal DTsample. The voltage Vsample is the voltage Vsample charged in the second capacitor Csf1 (see FIG. 4F). Further, the pulse signal DTsample is applied to the D-flip-flop 224 and the output signal EN of the second RS latch 214 is outputted to the fourth latch 232 as the selection signal SFLen (see FIG. 4M). The selection signal SFLen is low. Accordingly, the fourth latch 232 outputs a signal of a second terminal, i.e., the second signal Vsample as the output signal Von (see FIG. 4I).

Thereafter, in the period III, when the voltage charged in the second capacitor Csf1, i.e., the second reference wave Vsf1 exceeds the second reference voltage Vref2, the second reset signal Vc is outputted form the second comparator 213 (see FIG. 4G). The outputted second reset signal Vc is inputted into the S terminal of the second RS latch 214 and the high signal EN is outputted from the Q terminal of the second RS latch 214 (see FIG. 4G). The second transistor Q2 is turned on by the high signal outputted form the Q terminal of the second RS latch 214 and the voltage charged in the second capacitor C2 is discharged through the second transistor Q2 (see FIG. 4F). At this time, the zero current sensing signal DT becomes the output signal DTint of the third latch 221 by the high signal outputted from the Q terminal of the second RS latch 214 (see FIG. 4J). The high output signal DTint is delayed by the delay unit 222 for a predetermined time to become a delay signal DTd, which is inputted into the R terminal of the second RS latch 214 (see FIG. 4K). A low signal is outputted from the Q terminal of the second RS latch 214 by the inputted delay signal DTd, as a result, the second transistor Q2 is turned off and the second capacitor Csf1 starts to be charged again (see FIG. 4F).

As set forth above, according to the exemplary embodiments, the power factor of a power converting module may be corrected through increasing the average value of an input current by switching a main switching element of a power converting module on the basis of a reference wave having a slope based on a first signal and an error voltage, in particular, by limiting a switching frequency on the basis of a reference wave having a slope based on a second signal lower than a first signal and an error voltage when the switching frequency of the main switching element increases because an input voltage of the power converting module is low.

While the present invention has been shown and described in connection with the exemplary embodiments, it will be apparent to those skilled in the art that modifications and variations can be made without departing from the spirit and scope of the invention as defined by the appended claims. Accordingly, the scope of the present invention will be determined by the appended claims.

What is claimed is:

1. A power factor correction circuit, comprising:
   a power converting module configured to convert an input voltage into an output voltage having a predetermined magnitude by controlling an inductor current according to a main switching signal applied to a main switch;
   a signal selecting module configured to
      selectively output a first signal having a fixed value or a second signal having a variable value smaller than the first signal, for determining a slope of a first reference wave on a basis of the inductor current, and
      generate a set signal for rising the first reference wave;
   a first reference wave generating module configured to generate the first reference wave that rises at the slope based on any one of the first signal and the second signal according to the set signal and is reset according to a first reset signal based on an error voltage between the output voltage and a predetermined first reference voltage; and
   a main switching signal generating module configured to generate the main switching signal which is set to be Low (L) by the first reset signal and to be High (H) by the set signal;
   wherein the signal selecting module includes:
   a first module configured to generate a second reference wave that increases depending on a delay signal acquired by delaying the set signal for a predetermined time and is reset depending on a second reset signal formed based on a second reference voltage;
   a second module configured to generate a selection signal for selecting any one of the first signal and the second signal on a basis of the second reset signal and a zero current sensing signal generated during a period in which the inductor current is zero, a pulse signal for detecting a rising edge of the zero current sensing signal, and the set signal; and
   a third module configured to
      sample a magnitude of the second reference wave at the time when the rising edge is detected,
      set the corresponding sampled magnitude as the second signal, and
      selectively output any one of the first signal and the second signal on a basis of the selection signal.

2. The power factor correction circuit of claim 1, wherein the first module includes:
   a current source;
   a second capacitor connected to the current source in series;
   a second comparator having a positive (+) terminal connected to a connection portion between the current source and the second capacitor and a negative (−) terminal to which the second reference voltage is applied;

a second transistor having a drain connected to the (+) terminal of the second comparator, a source which is grounded, and a gate connected to a Q terminal of a second RS latch; and the second RS latch having the Q terminal connected to the gate of the second transistor, an S terminal connected to an output terminal of the second comparator, and an R terminal connected to the outside.

3. The power factor correction circuit of claim 2, wherein the second module includes:

a third latch configured to
receive a voltage of 0V through a first input terminal thereof,
receive the zero current sensing signal through a second input terminal thereof, and
output a signal inputted into the first input terminal or the second input terminal depending on an output from the Q terminal by being connected to the Q terminal of the second RS latch;

a delay unit having an input terminal connected to the output terminal of the third latch and an output terminal connected to the R terminal of the second RS latch to generate the delay signal delayed from the set signal inputted into the first input terminal or the second input terminal by the predetermined time;

a rising edge detecting unit connected to the second input terminal of the third latch to output the pulse signal when the zero current sensing signal rises; and a D-flip-flop having a D terminal connected to the Q terminal of the second RS latch and configured to output a signal outputted from the Q terminal of the second RS latch as the selection signal according to the pulse signal from the rising edge detecting unit.

4. The power factor correction circuit of claim 3, wherein the third module includes:

a sampling unit having one end connected to a connection portion of the second capacitor and the current source and configured to generate the second signal acquired by sampling the magnitude of the voltage charged in the second capacitor according to the pulse signal from the rising edge detecting unit; and a fourth latch connected to an output terminal of the sampling unit to receive the second signal inputted from the output terminal through a first input terminal and receive the first signal through a second input terminal and configured to selectively output the first signal or the second signal according to the selection signal outputted from the D-flip-flop.

5. The power factor correction circuit of claim 4, further comprising a voltage follower between (i) the connection portion between the second capacitor and the current source and (ii) the sampling unit.

6. The power factor correction circuit of claim 1, wherein the power converting module includes a boost-type converter.

7. The power factor correction circuit of claim 1, wherein the power converting module is configured to control the inductor current in any one of a boundary conduction mode (BCM) and a discontinuous conduction mode (DCM) depending on the main switching signal.

8. The power factor correction circuit of claim 1, wherein the first reference wave and the second reference wave are triangular waves.

9. The power factor correction circuit of claim 1, wherein the power converting module is configured to control the inductor current to
operate in a discontinuous conduction mode (DCM) when the zero current sensing signal is generated before the second reference wave which rises according to the set signal reaches the second reference voltage, and
operate in a boundary conduction mode (BCM) when the zero current sensing signal is generated after the second reference wave which rises according to the set signal reaches the second reference voltage.

10. The power factor correction circuit of claim 3, wherein the rising edge detecting unit includes:
an inverting portion configured to receive the zero current sensing signal and constituted by an even number of inverters which are connected to each other in series; and
an AND gate configured to receive an output of the inverting portion and the zero current sensing signal.

11. A power factor correction circuit, comprising:
a power converting module configured to convert an input voltage into an output voltage having a predetermined magnitude by controlling an inductor current according to a main switching signal applied to a main switch;
a signal selecting module configured to
selectively output a first signal having a fixed value or a second signal having a variable value smaller than the first signal, for determining a slope of a first reference wave on a basis of the inductor current, and
generate a set signal for rising the first reference wave;
a first reference wave generating module configured to generate the first reference wave that rises at the slope based on any one of the first signal and the second signal according to the set signal and is reset according to a first reset signal based on an error voltage between the output voltage and a predetermined first reference voltage; and
a main switching signal generating module configured to generate the main switching signal which is set to be Low (L) by the first reset signal and to be High (H) by the set signal;
wherein the first reference wave generating module includes:
a current mirroring unit configured to mirror a current formed based on the first signal or the second signal;
a first capacitor configured to charge a voltage by the mirrored current; and
a first switch connected to the first capacitor in parallel and configured to control charging and discharging of the first capacitor according to the set signal or the first reset signal;
wherein the main switching signal generating module includes:
an error amplifier configured to generate the error voltage between the output voltage and the first reference voltage;
a first comparator configured to generate the first reset signal according to a comparison result between the error voltage and the first reference wave;
a first RS latch having an S terminal configured to receive an output of the first comparator, an R terminal configured to receive the set signal, and a Q terminal connected to an on/off control terminal of the first switch; and
an inverter between the Q terminal of the first RS latch and the main switch and configured to invert a signal outputted from the Q terminal of the first RS latch.

* * * * *